June 7, 1932.   L. ZAMBONI   1,861,772
BRAKING DEVICE
Filed June 16, 1930   2 Sheets-Sheet 1

Inventor
Lawrence Zamboni

June 7, 1932. L. ZAMBONI 1,861,772
BRAKING DEVICE
Filed June 16, 1930   2 Sheets-Sheet 2

Inventor
Lawrence Zamboni
By
Attorney

Patented June 7, 1932

1,861,772

UNITED STATES PATENT OFFICE

LAWRENCE ZAMBONI, OF PASADENA, CALIFORNIA

BRAKING DEVICE

Application filed June 16, 1930. Serial No. 461,566.

This invention relates to a means for checking or arresting the rearward movement of vehicles on grades or inclines and it has especial reference to an improvement in that type of devices for checking rotary motion more particularly set out in United States Patent #1,671,879, granted to me May 29, 1928. The general object of the invention is to provide a simple and effective device for restraining the rotation in a reverse direction of rotatable elements especially of those elements which form a part of the driving gear of motor vehicles, and thereby to prevent the rearward movement of such vehicles independently of the usual braking mechanism usually employed. The specific object of the invention is to provide a device of this character for especial use in motor vehicles of which the device shall form a component and in which it may be readily incorporated.

Another and important object of the invention is to provide a device of this type which is normally automatically operative to check the rearward movement of a motor vehicle and which is controllable to permit the vehicle to be moved rearwardly.

These and other objects are accomplished by a form of embodiment of the invention more specifically expressed in preferred form in the accompanying drawings, which form a part of this disclosure, and in which Fig. 1 is a sectional elevation showing my invention as applied to the gear case of a motor vehicle.

Fig. 2 is an enlarged section on line 2—2, Fig. 1.

Figure 1:
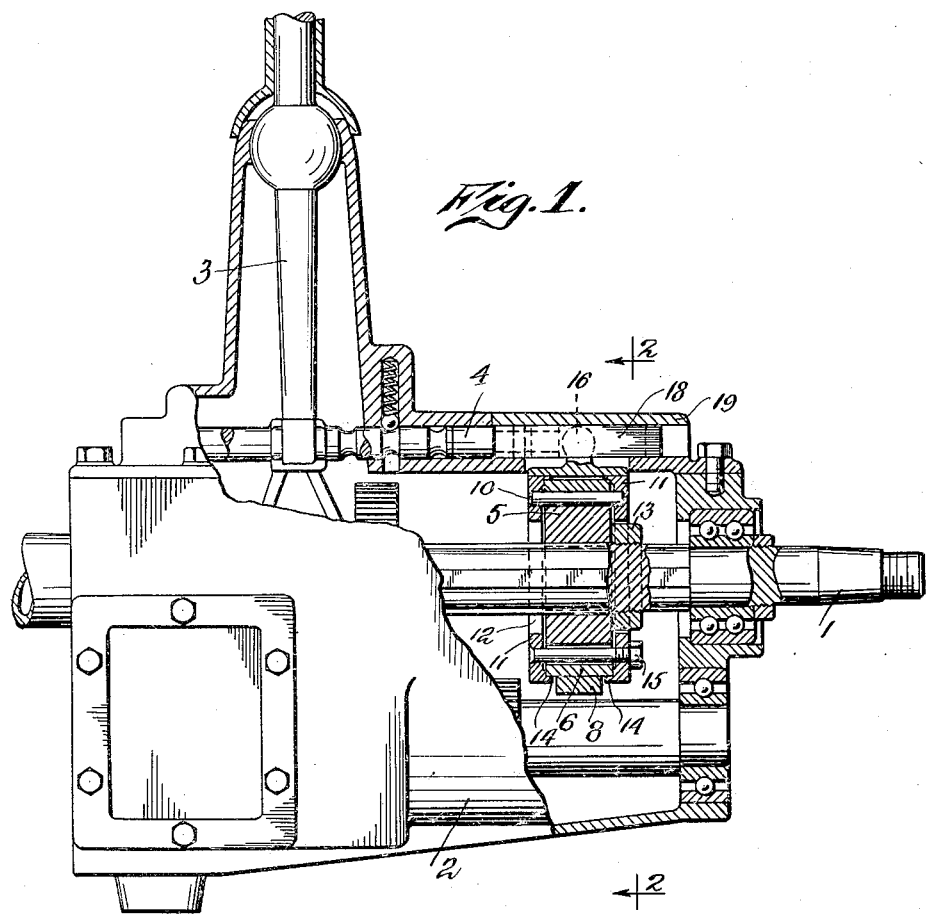

My invention consists of a stationary element surrounding the drive shaft of a motor vehicle and means normally operative to restrain the rearward motion of a vehicle, said means being manually controllable to hold the restraining means inoperative when a rearward motion of the vehicle is desired.

Referring to the drawings, which exemplify the invention and its practical application, 1 designates the drive shaft of a motor vehicle, 2 indicates the gear box or case, 3 the gear shift lever, and 4 one of the slidable rods that is movable by and with the gear shift lever for obvious purposes.

On the shaft 1 is secured for rotation therewith a drum 5. Surrounding said drum 5 and in spaced relation thereto is a concentric ring 6 provided on the inner circumference thereof with spaced arcuate recesses 7 which are eccentric to the drum 5. This ring 6 is preferably of steel and is inset and secured in any desirable manner in a block 8 that is rigidly secured by bolts 9 or otherwise in the gear box or case 2. By means of a plurality of pins, rollers or bars 10, which are disposed in the recesses 7 provided in the ring 6, the rotation of the drum 5 and shaft 1 in rearward direction may be positively restrained while the free movement thereof in the forward direction may take place. These pins, rollers or bars 10 extend transversely through the arcuate recesses 7 in the ring 6 and the respective ends thereof are journaled in plates 11, provided on each side of the drum 5 and having apertures 12 for accommodating the shaft 1 and a nut 13 for locking the drum 5 against movement longitudinally of the shaft 1. Each of said plates 11, is provided with a peripheral flange 14 extending over the inset ring 6 which as seen in Fig. 1, projects beyond the block or support 8 and forms a bearing for the plates 11 which are oscillatable relatively to said ring 6. The shaft 1 and drum 5 therefore rotate free of said plates 11. The plates 11 on opposite sides of the ring 6 are held conjoined by a plurality of bolts 15 which extend transversely through the concentric space between the drum 5 and the ring 6.

Figure 3:
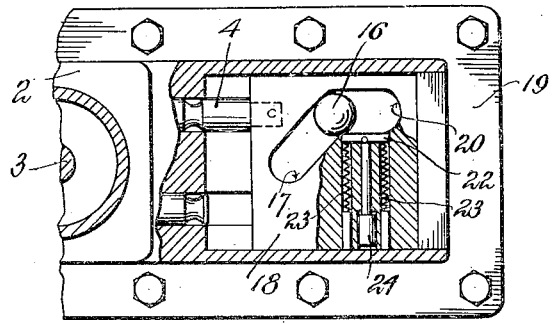
Fig. 3 is a plan section on the line 3—3, Fig 2.

To the top of the plates 11 is secured a lever 16 by which the rotative movement thereof may be accomplished to cause the pins, rollers or bars 10 to be moved to inoperative position, that is, the position in which the pins or bars 10 will be held against wedging between the arcuate recesses 7 and the drum 5, when a rearward propulsion or movement of the vehicle is desired. The lever 16, extends into or through a cam or angle slot 17, in a slide 18 that is contained in a housing 19, bolted or otherwise secured to the gear case 2. The slot 17, as seen in Fig. 3, is extended as seen at 20 to provide a lost motion space to accommodate the lever 16, when the gear shift lever 3 is operated in a direction opposite the reverse direction. The slotted slide 18 is connected to the slidable rod 4, that is under the control of the gear shift lever, this rod being provided with usual means for retaining it in adjusted position.

In the position of the parts illustrated in Fig. 2, the pins or rollers 10 will wedge between the arcuate recesses 7 and the drum 5 whenever the vehicle tends to move rearwardly, it being noted that the operating lever 16, is in the portion 20 of the slot 17, whereby such action is permitted. When the slide 18 is moved rearwardly by the action of the lever 3 in shifting the gears into reverse, the cam or angle slot 17 in the slide 18, will rotate the lever 16 thereby moving the pins or bars 10 approximately centrally of the arcuate recesses 7 as seen in dotted lines, Fig. 2, and hold same in such position.

The rearward movement of the vehicle may then take place under its own power.

In order to maintain the pins or bars 10 carried by the plates 11 in such position that they will instantly function, that is, wedge between the ring 6 and drum 5 and prevent the rearward motion of the vehicle before it attains any momentum, and in order to prevent a rigid pressure of said bars or pins at the point of wedging, I provide a means for exerting a slight yielding pressure upon the lever 16 which pressure is communicated to the pins or bars 10. When the vehicle therefore moves forwardly, the pins or bars 10 will be maintained in yielding position for instant wedging to halt the rearward movement of the vehicle without imposing upon said pins or bars 10 a frictional wearing pressure. Such a means is shown in Fig. 3 and comprises a plate 22, that constitutes one wall of the extended slot portion 20. This plate is under tension of springs 23 and is guided by a stem 24 which limits its projection into the slot portion 20, which as seen in Fig. 3 is wider than the lever 16, which is always free of the opposite wall of the slot portion 20. The spring pressed plate 22 therefore yieldingly holds the pins or bars 10 in position for wedging.

Figure 4:
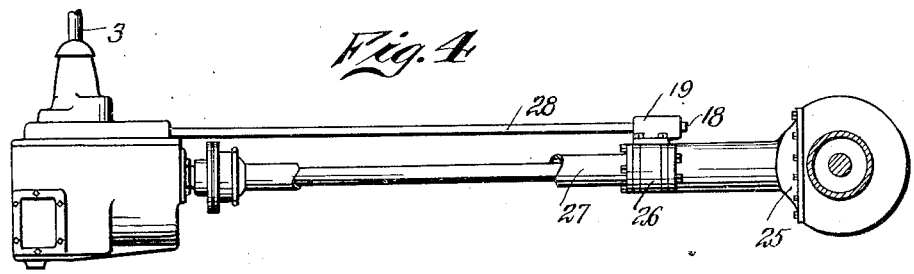
Fig. 4 is a side elevation illustrating the application of the device to the drive shaft of a motor vehicle.
Figure 3:
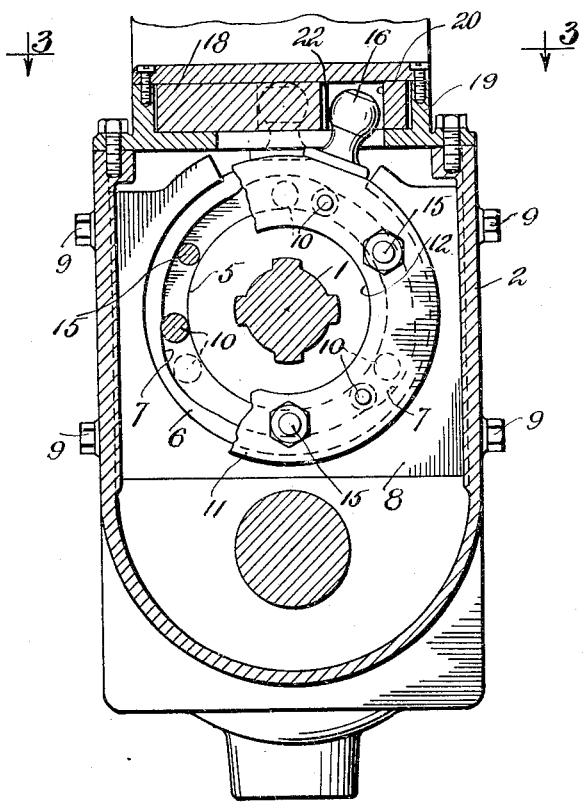

In Fig. 4, I have illustrated the application of the braking device to the drive shaft, that is to that portion of the drive shaft 1 near the differential housing 25. The braking elements as described are mounted in a housing 26, that is connected to the torque tube 27 which encloses the drive shaft 1, and the slide 18 for actuating the braking device connected with a rod 28, that is connected to the slidable rod 4 which, as stated is operable by the gear shift lever 3.

What I claim, is:

1. A device for checking the rearward movement of a motor vehicle comprising, in combination with the drive shaft of such vehicle, a drum secured thereon, a stationary ring surrounding and spaced from said drum and provided with recesses, a pair of plates rotatably mounted on said ring and carrying rolling means which cooperate normally with said recesses and drum to check the rearward motion of said shaft, a lever on said plates, a slide having a cam slot into which said lever extends, and means on said slide to exert a yielding pressure upon said lever and thereby maintain said rolling means in position to wedge immediately and prevent the rearward movement of the shaft, said slide being operable by the movement of the gear shift lever into reverse to rotate said plates and thereby cause said rolling means to be moved and held in inoperative position.

2. A device for checking the rearward movement of a motor vehicle, comprising in combination with such vehicle and the drive shaft thereof, a drum on said drive shaft, a stationary body surrounding and spaced from said drum and provided with recesses, rolling means in and normally operative to check the rearward rotation of said drum, plates mounted on said body, and carrying said rolling means, a slide engaging said plates and controllable by the movement of the gear shift lever into reverse to hold said rolling means in inoperative position, and means exerting a yielding pressure upon said plates to maintain said rolling means in normally operative position.

In testimony whereof I have set my hand.

LAWRENCE ZAMBONI.